United States Patent [19]
Drago et al.

[11] Patent Number: 5,461,188
[45] Date of Patent: Oct. 24, 1995

[54] SYNTHESIZED MUSIC, SOUND AND LIGHT SYSTEM

[76] Inventors: Marcello S. Drago, 17557 Rhoda St., Encino, Calif. 91316; Alexander Leon, 12450-2 Ralston Ave.; Kenneth J. Franco, 12454-2 Ralston Ave., both of Sylmar, Calif. 91342

[21] Appl. No.: 206,324
[22] Filed: Mar. 7, 1994
[51] Int. Cl.[6] ............ A43B 13/00; A63J 17/00; F21L 15/08; G10H 1/32
[52] U.S. Cl. ............ 84/600; 84/464 R; 36/137; 362/103
[58] Field of Search ............ 84/600, 644, 670, 84/718, 743, 464 R, 464 A, 477 R, 478; 36/137; 362/103

[56] References Cited

U.S. PATENT DOCUMENTS

| | | | |
|---|---|---|---|
| 4,571,680 | 2/1986 | Wu | 84/484 X |
| 4,848,009 | 7/1989 | Rodgers | 36/137 |
| 5,046,394 | 9/1991 | Suzuki et al. | 84/600 |
| 5,147,969 | 9/1992 | Hiyoshi et al. | 84/600 |
| 5,247,864 | 9/1993 | Konishi | 84/464 R X |
| 5,266,732 | 11/1993 | Suzuki | 84/464 R X |
| 5,338,891 | 8/1994 | Masubuchi et al. | 84/600 |

*Primary Examiner*—Stanley J. Witkowski
*Attorney, Agent, or Firm*—Albert O. Cota

[57] ABSTRACT

A synthesized music, sound and light system (10) that is incorporated into articles of clothing (60) such as a pair of shoes. The system (10) when activated, allows a multiplicity of lights (32) to illuminate in synchrony with the rhythmic beat of either an internal or an external music or sound program that is heard through an audio transducer (26). When the system (10) is incorporated into a pair of shoes, a person can perform a dance routine or other form of expression in compliment with the selected music and light program. To enhance the utility of the invention, the system includes three user operated controls: a music program select switch (S1) that allows the selection of musical light programs, a control that allows the speed of the lights and rhythmic beat of the selected program to be increased or decreased, and a control that allows setting the volume of the sound.

32 Claims, 7 Drawing Sheets

| Program > | LIGHT PROGRAM BITS | | | SOUND PROGRAM BITS | | | | |
|---|---|---|---|---|---|---|---|---|
| Used > | Red | Green | Yellow | Bass Drum | Tom-Tom | Snare | Hi-Hat | Cymbal |
| Memory Address (Hex) | 7 (MSB) | 6 | 5 | 4 | 3 | 2 | 1 | 0 (LSB) |
| 00 | 0 | 0 | 1 | 1 | 0 | 0 | 1 | 1 |
| 01 | 0 | 0 | 1 | 0 | 0 | 0 | 0 | 0 |
| 02 | 0 | 0 | 0 | 0 | 0 | 0 | 1 | 0 |
| 03 | 0 | 0 | 0 | 1 | 0 | 0 | 0 | 0 |
| 04 | 0 | 1 | 0 | 0 | 0 | 0 | 1 | 0 |
| 05 | 0 | 1 | 0 | 0 | 0 | 0 | 0 | 0 |
| 06 | 0 | 0 | 0 | 0 | 0 | 0 | 1 | 0 |
| 07 | 0 | 0 | 0 | 0 | 0 | 0 | 0 | 0 |
| 08 | 1 | 0 | 0 | 0 | 0 | 1 | 1 | 0 |
| 09 | 1 | 1 | 1 | 1 | 0 | 0 | 0 | 0 |
| 0A | 0 | 1 | 1 | 0 | 0 | 0 | 1 | 0 |
| 0B | 0 | 0 | 0 | 0 | 0 | 0 | 0 | 0 |
| 0C | 0 | 0 | 0 | 1 | 0 | 0 | 1 | 0 |
| 0D | 0 | 0 | 0 | 1 | 0 | 0 | 0 | 1 |
| 0E | 1 | 1 | 0 | 0 | 0 | 0 | 0 | 0 |
| 0F | 0 | 1 | 0 | 0 | 0 | 0 | 0 | 0 |

SYNTHESIZED MUSIC, SOUND AND LIGHT SYSTEM

TECHNICAL FIELD

The invention pertains to the general field of miniature, multi-colored pattern lighting systems and more particularly to a synthesized music system having light sources that illuminate in accordance to patterns created through an aesthetic creative process, with said patterns displaying in synchronization with a music or sound source meter and with the light patterns being free to associate with any sound and meter so as to provide maximum creative audio-visual flexibility.

BACKGROUND ART

In the prior art, there are disclosed numerous articles of clothing, including shoes, that incorporate animated and non-animated optical displays. These displays, generally consist of several miniature incandescent lamps and or light emitting diodes (LEDs) that are embedded or otherwise placed on the article of clothing. The light displays are generally controlled by a battery operated electronics control circuit that is either located within the article of clothing or hardwired to a cable attached to a switch/control unit that operates the electronics control circuit.

The prior art devices all disclose control circuits that operate the lights with a selectable random or controlled lighting sequence. None of these prior art designs disclosed a system which allows a user to either select the tempo of the light sequence or, to have the light sequence tempo set and controlled by an internal or external music source. Additionally, the prior art did not disclose two separated articles of clothing, such as a pair of shoes, that operate in synchrony by means of a wireless data link.

The search of the prior art did not disclose any patents or sales literature that read directly on the claims of the instant invention. However, the following U.S. patents were considered related:

| U.S. Pat. No. | INVENTOR | ISSUED |
| --- | --- | --- |
| 5,128,843 | Guritz | 7 July 1992 |
| 5,052,131 | Rondini | 1 October 1991 |
| 4,875,144 | Wainwright | 17 October 1989 |
| 4,848,009 | Rodgers | 18 July 1989 |
| 4,709,307 | Branom | 24 November 1987 |

The U.S. Pat. No. 5,128,843 Guritz discloses an optical display device that is secured to active limbs of a body in motion. The body movement enhances an optical display that illuminates the wearer for ornamental or safety purposes. The device consists of a plurality of lamps which are coupled to four flexible strip circuit boards. Each circuit board has a translucent shield placed over the length of the circuit board to cover the lamps for protection from moisture, impact and provide alternative colored illumination. Placement of the device is on each upper arm of the user with a second circuit board positioned on each portion of a person's lower arm. A control circuit is included for energizing the lamps.

The U.S. Pat. No. 5,052,131 Rondini discloses a sandal having a combination strap. The strap includes decorative lighting fully encased in transparent tubing that is connected to a battery timed switch for flashing the lights. The battery compartment is located in the sole of the sandal together with a switch for opening and closing the circuit.

The U.S. Pat. No. 4,875,144 Wainwright discloses a fabric illuminated by the outer ends of a large number of optical fibers that form an illuminated changing display of several figures. The fibers extend along the inner surface of the fabric and are gathered into several bundles each of which engages a connector housing having a light source. The light source is connected to a power source that energizes an electronic control device which sequentially causes each light source to be activated in a programmed manner.

The U.S. Pat. No. 4,848,009 Rodgers discloses footwear which are provided with a battery and a plurality of light sources. A motion responsive switch is included to intermittently connect the battery to the light sources which consist of light emitting diodes (LEDs). The footwear also includes a circuit that extinguishes the lights after a predetermined time interval.

The U.S. Pat. No. 4,709,307 Branom discloses an article of clothing that includes a shell forming an outer layer, a liner disposed generally inside the shell and forming an inner layer of the clothing, and a set of light-emitting diodes (LEDs) forming a predetermined pattern on the exterior of the clothing. A power source is located within the clothing, for illuminating the LED's as is a control circuit for controlling the energization of the LEDs. A cable electrically connects the LED's and the power source and an overlay secured to the shell, has imprinted a pattern corresponding to the predetermined pattern of the LED's.

For background purposes and as indicative of the art to which the invention relates, reference may be made to the following remaining patents found in the search:

| U.S. Pat. No. | INVENTOR | ISSUED |
| --- | --- | --- |
| 5,113,325 | Eisenbraun | 12 May 1992 |
| 5,033,212 | Evanyk | 23 July 1991 |
| 5,019,438 | Rapsiarda | 28 May 1991 |
| 4,935,851 | Wood | 19 June 1990 |
| 4,812,953 | Ask, et al | 14 March 1989 |
| 4,748,366 | Taylor | 31 May 1988 |
| 4,130,951 | Powell | 26 December 1978 |
| 4,112,601 | Chiaramonte, Jr. | 12 September 1978 |

DISCLOSURE OF THE INVENTION

The synthesized music, sound and light system is designed to be incorporated into an article of clothing that includes shoes, jackets, arm bands and waist bands. The system includes a multiplicity of light sources such as light emitting diodes (LEDs) that may be of multiple colors and illuminate according to a program executed in synchrony with the rhythmic beat of either an independent internal or external music or sound program, and without any one light illumination being necessarily associated with or tied to any one particular note, sound, pitch, beat or meter. The light and sound programs are independent in order to provide maximum creative flexibility, but are executed in synchrony in order to provide an enhanced audio-visual aesthetic effect. The programs are stored in parallel sharing common memory locations in order to achieve maximum circuit minimization and reduction in manufacturing costs. The invention is particularly amenable for incorporation into a pair of shoes. When these shoes are worn and the system is activated, a person can perform a dance routine or other form of expression in compliment with the selected music and light program. In lieu of a dance routine, the music and light program can be turned on and enjoyed by just listening and watching the light display.

The system includes three user operated controls: a music select switch that allows any of multiple musical instrument programs to be selected, a control that allows setting the speed of the lights and the rhythmic beat of the selected musical programs to be increased or decreased, and a control that allows setting the volume of the sound. Additionally, it may include a switch that would set the system into a "color organ" mode in synchrony with external music and using the audio transducers as pickups.

In its most basic design, the synthesized music, sound and light system is comprised of:

1. a music program,
2. a light patterns program,
3. a program control circuit consisting of a system clock that sequences a program memory circuit. The program memory has means for storing the music program and the light patterns program and simultaneously producing sound control signals and light control signals in response to the system clock and in accordance with the music program and the light patterns program.
4. a sound generating circuit having means for receiving and processing the sound control signals from said program memory circuit and thereafter producing a sound signal.
5. an audio processing circuit having means for receiving and processing the sound signal from said sound generating circuit. The output of the audio processing circuit is an audio transducer drive signal that operates at least one audio transducer from where the sound is heard,
6. a light control circuit having means for receiving and processing the simultaneous light control signals from said program memory circuit and thereafter producing light source drive signals in the form of suitable voltage or current, and
7. a multiplicity of light sources which may be multicolored, and which are energized by the light control circuit drive signals, independently or simultaneously, in accordance with the light program and with some temporal relationship to the sound from an audio transducer, so an enhanced aesthetic or other effect can be achieved in accordance with the composer-programmer wishes.

The program memory circuit can be designed to incorporate permanent programs of lights and sounds, or a re-programmable memory may be utilized that allows user selectable music sound programs complementing light display programs to be created or modified. Additionally, the basic design of the system can be enhanced by using the audio transducers in a pickup mode i.e., as a microphone and using external audio input to trigger the light control circuit, or using an external light display program. Thus, operating as a light organ circuit that is activated by a microphone or another external program source. When this circuit is activated, a memory disabling signal is produced that either disables the internal program memory input to clock the internal memory and allows the light control circuit to be operated in a light organ mode. When so controlled, the light control circuit energizes the light sources in synchrony with the ambient audible sounds detected by the audio transducers, which are in a pickup mode or a separate microphone.

The system is also designed to be used in combination with a pair of separated articles of clothing for example, a pair of shoes. In this implementation, a first pair of shoes incorporates the system which also includes a data-link transmitting circuit that produces a master control signal that encompasses the music, sounds and light programs of the system. The second shoe incorporates an identical grouping of lights, a speaker and a data-link receiving circuit that receives the master control signal that allows the second shoe to respond in synchrony with the light and sound programs of the first shoe. This could also be extended to a complete outfit encompassing various pieces of apparel.

In view of the above disclosure, it is the primary object of the invention to produce a synthesized music, sound and light system that illuminates a multiplicity of light sources in accordance to some aesthetic program and in synchrony with the beat of a sound program, but without a fixed relationship between any one light source and sound in order to achieve maximum creative and aesthetic flexibility. In addition to this primary object, it is also an object of the invention to produce a system that:

can be incorporated into various articles of clothing including a pair of shoes, converts ordinary shoes into high-fashion shoes designed to be worn in discos and the like, can be made with external facing components i.e., lights and speakers that are impervious to moisture, is particularly suited for theatrical and nightclub performers, can be manufactured with custom lighting and sounds, can be designed to operate with both lights and sound, lights only or sound only, can be further embellished by attaching reflective materials to the article of clothing, is highly reliable and relatively maintenance free, is cost effective from both a manufacturer and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment that covers a synthesized music, sound and light system. The system produces synchronized sound and multi-colored lights display that can be incorporated into various articles of clothing such as a pair of shoes, an arm or waist band, a vest or a hat.

The preferred embodiment of the synthesized music, sound and light system 10 as shown in FIGS. 1–10 is comprised of the following major elements: a system program control circuit 12 that is disclosed in a first design that includes a system clock 14 and a program memory circuit 16 and in a second design that includes a clock 14, a program memory circuit 16, a central processing unit (CPU) 18 and a user interface circuit 20. Both the first and second designs operate with a sound generating circuit 22, an audio processing circuit 24, an audio transducer 26, a light control circuit 28, a voltage or current drive circuit 30 and a set of light sources 32.

Figure 1:
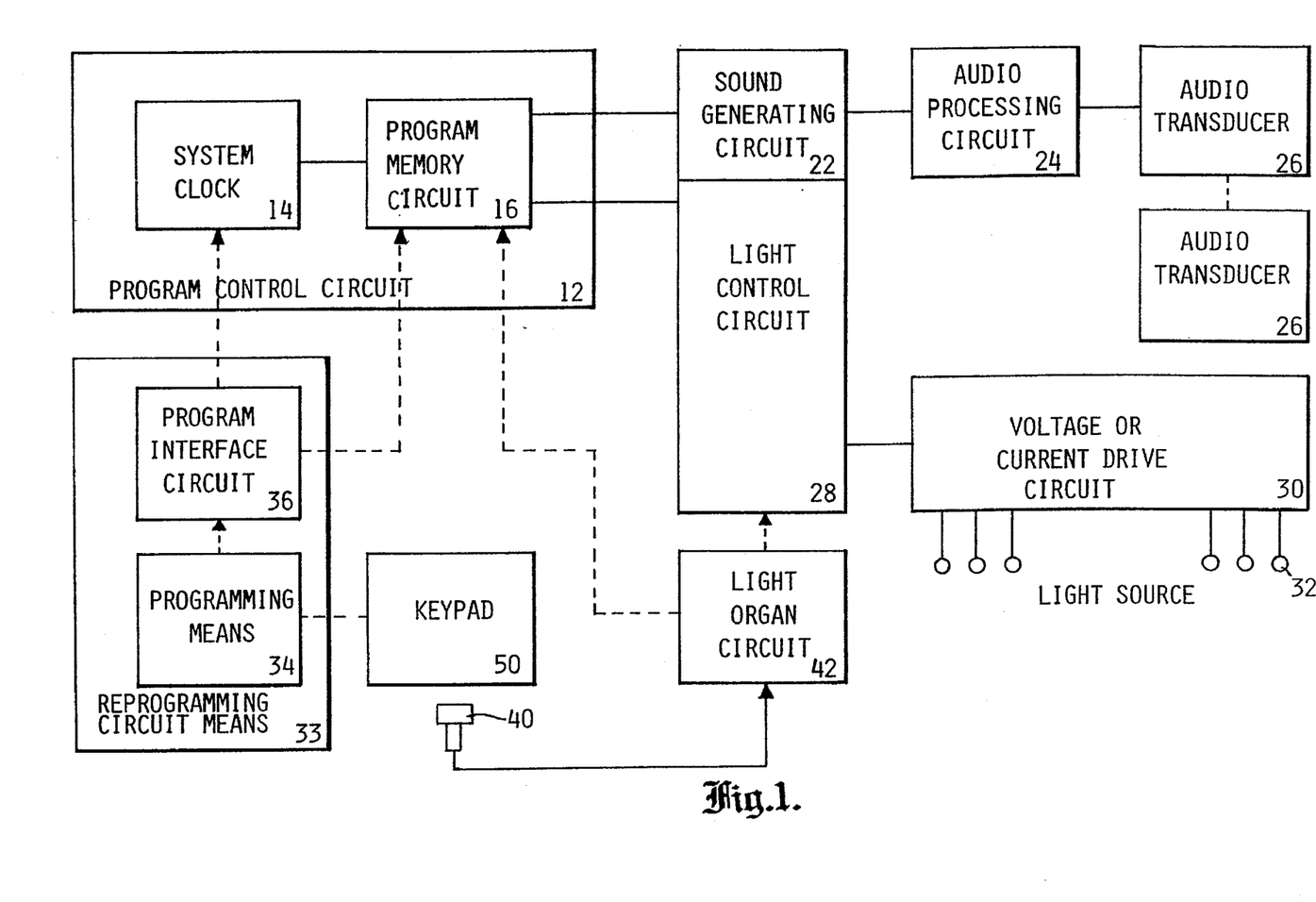
FIG. 1 is a block diagram of a synthesized music, sound and light system that operates with a first design of a system program control circuit that includes a system clock and a program memory circuit.

The first system design which is shown in the block diagram of FIG. 1, consists of a program control circuit 12 having means for producing sound control signals and light control signals. The program control circuit 12 of the first design is comprised of the system clock 14 and the program memory circuit 16. The system clock may consist of an NE555 timer that is configured as an astable multivibrator that produces a time base pulse. The system clock, as shown in the partial schematic of FIG. 3, includes a control that allows a user to control the clock frequency which in turn, controls the tempo or speed of the music or sound emanating from the speaker 26 and the speed of the light sources patterns 32.

Figure 11:
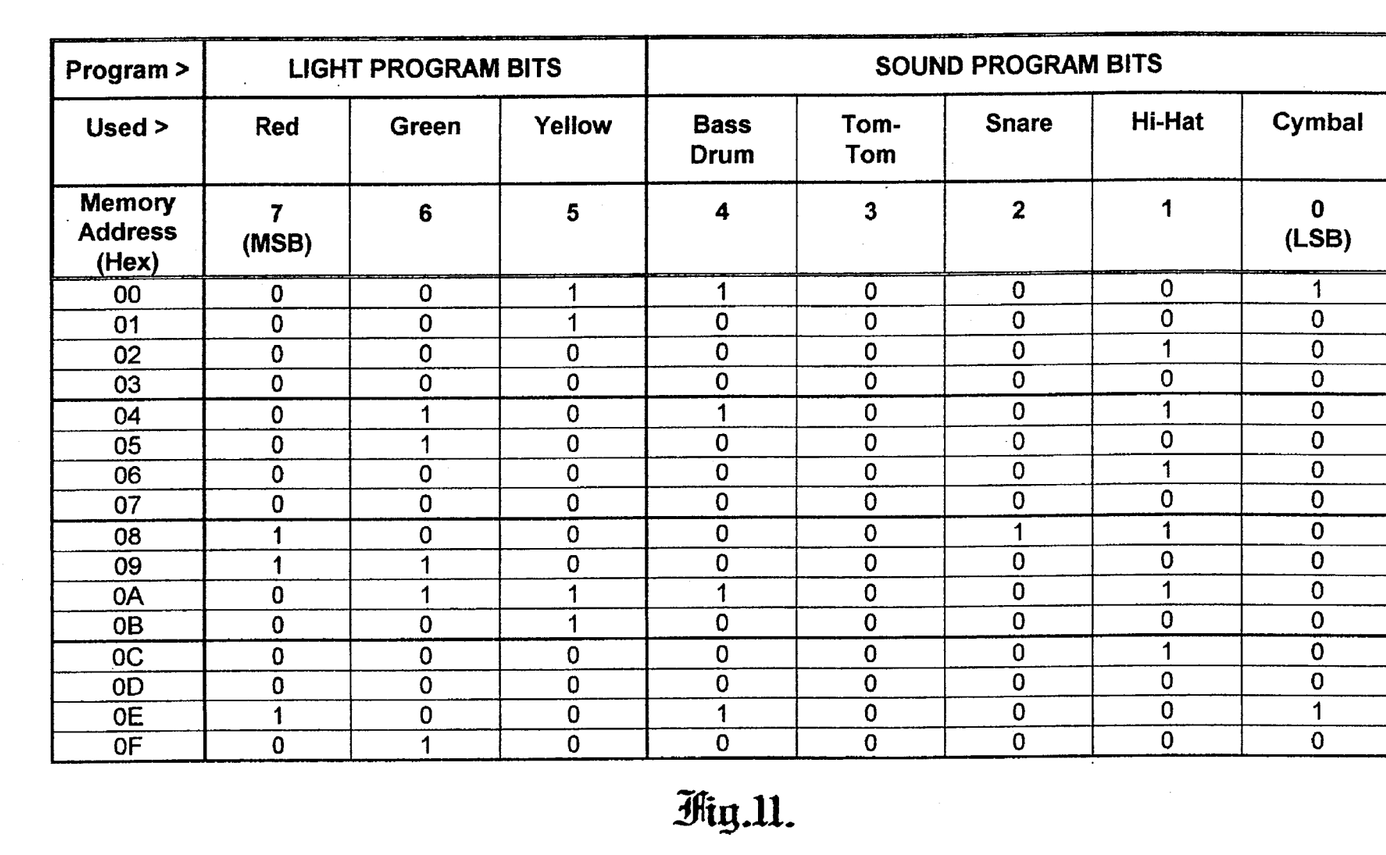
FIG. 11 is a diagram showing a low cost and efficient way of sharing memory circuit address registers between the music program and the light program using 1 bar of music.
Figure 12:
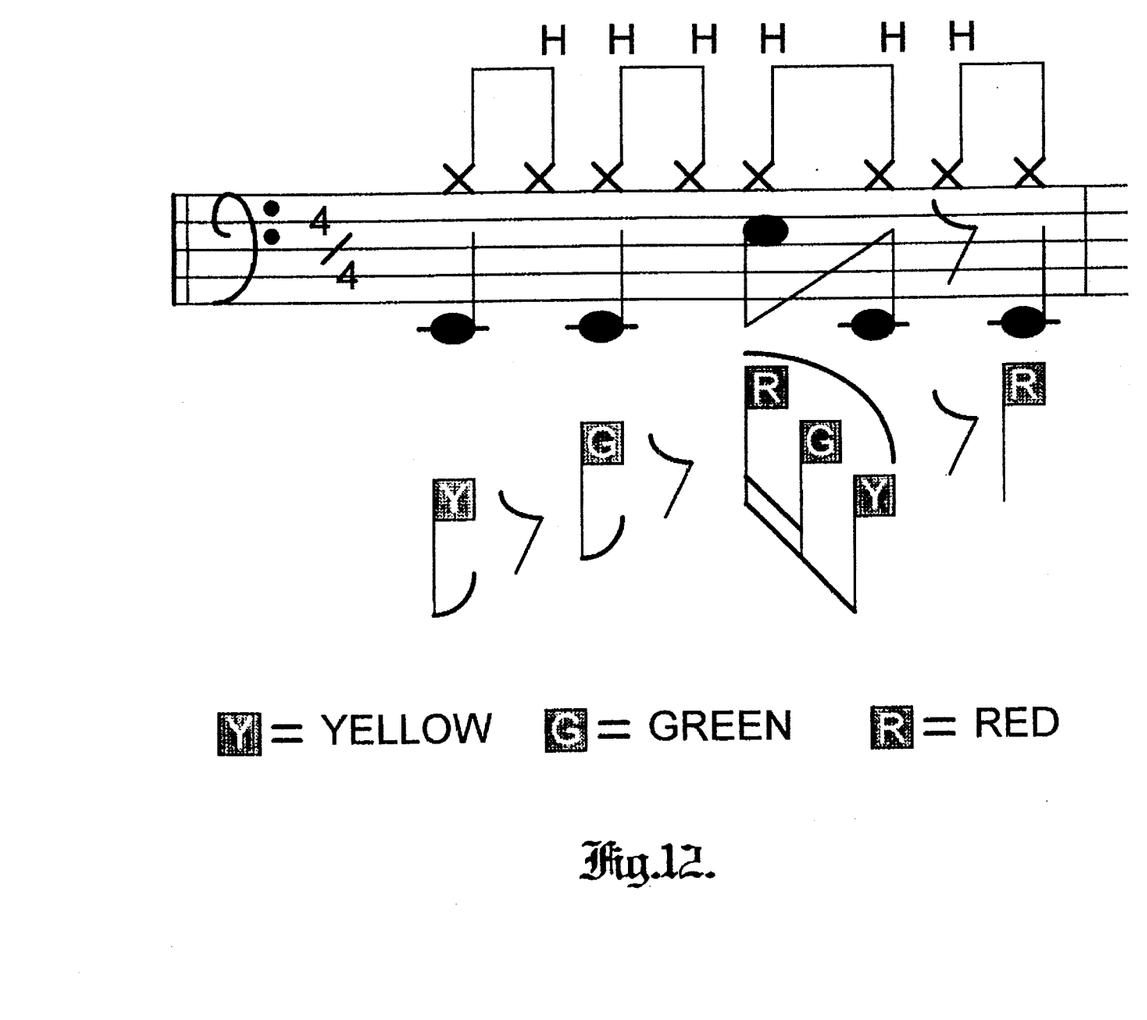
FIG. 12 shows in music notation what is stored in the 1 bar music sample used in FIG. 11, including light program information.

The program memory circuit 16 has means for storing the audio programs and light sources programs in parallel, sharing memory locations. Referring to FIG. 11, bits 0–4 in each 8 bit register store the audio program information while bits 5–7 store the lights program information. This example shows 1 music bar of drums in 4/4 time. Each beat occupies four 8-bit memory register locations which allow time subdivision down to 1/16th notes with each sixteenth using one 8-bit memory register. The operation is not unlike that of a sequencer or drum machine as it exists in prior art. Resolution can be increased by increasing the number of memory locations assigned to each beat. The program memory circuit 16 also has means for receiving and processing the time base pulse from the system clock 14. The pulse sequences the memory circuit 16 which then simultaneously produces the sound control signals and the light control signals in accordance with the audio and light programs stored in parallel, sharing register locations within the program memory circuit. The program memory 16 in the preferred embodiment, consists of a CD4040 binary ripple counter and a 28C16 random access memory (RAM). The counter provides a counting function and its output sequences the RAM. The RAM allows data to be stored and this data may be erased at any time and new data stored in its place.

The program memory circuit 16 may be one of two basic types of devices: a one-time programmable device or a re programmable type. When a re programmable type is used, the optional reprogramming circuit means 33 allows the editing and/or changing of the sounds program and the lights program by altering the contents of the memory circuit 16.

The memory circuit 16 as shown in FIG. 1, is disclosed in three implementations: the first is a programmable read only memory (PROM), the second is an erasable programmable read only memory (EPROM) and the third is an electrically-erasable programmable read-only memory (EEPROM). When a PROM is used reprogramming can only take place by removing it from the circuit and replacing with another having a different program. When an EPROM is used it can also be replaced or may be removed and reprogrammed off-circuit. When an EEPROM is used, it can either be removed from the circuit and replaced with another or reprogrammed off-circuit with different program data; or, it can be reprogrammed in-circuit, by the reprogramming circuit means 33 comprising. The programming means 34 and the program interface circuit 36. The programming means 34 may consist of either a personal computer or workstation, a series of buttons of keypad 50, in combination with a program interface circuit 36 logic circuitry or micro-controller; a synthesizer or musical instrument; or some other source of program data. The program interface circuit 36, in turn may comprise either a serial interface, a parallel interface, a musical instrument digital interface (MIDI) or some other interface.

The in-circuit reprogramming signals are applied through a program interface circuit 36 as shown in FIG. 1, where the signal is processed and upon reaching the program control circuit 12 in turn produces two signals: the first is a clock interface signal that is applied to the system clock 14 to allow a user to control the operation of the clock 14, and, the second, a program memory interface signal that is applied to the program memory circuit 16 to allow a user to step into and modify specific memory locations.

The new program information can be sent through a transmission means, that may consist of a cable, an infrared link or a radio transmission to the program interface circuit 36 from where a program memory interface signal is produced and sent to the program memory circuit 16. The interface protocol may be an RS-232 serial type, a MIDI interface or some other standard or custom type interface. The programming information can also be transmitted in real-time; i.e. simultaneously and in synchronization with the audio from said transducer, an external audio transducer and a pattern displayed by said light sources.

The output of the program memory circuit 16, as shown in FIG. 1, consists of sound control signals that are applied to the sound generating circuit 22 and simultaneous light control signals that are applied to the light control circuit 28. The sound generating circuit 22 which receives and processes the sound control signal may be of the analog or digital type.

Figures 3, 4:
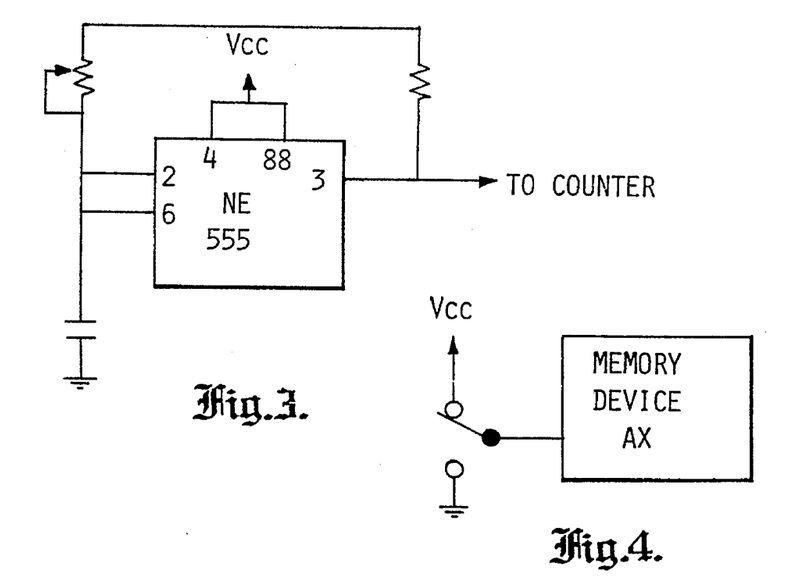
FIG. 3 is a partial schematic diagram showing a system clock having a NE555 integrated circuit that includes a control that allows a user to control the clock speed.
FIG. 4 is a partial schematic diagram showing a SPDT switch S1 for electing the memory region whereby a particular sound and light program is selected.
Figure 5:
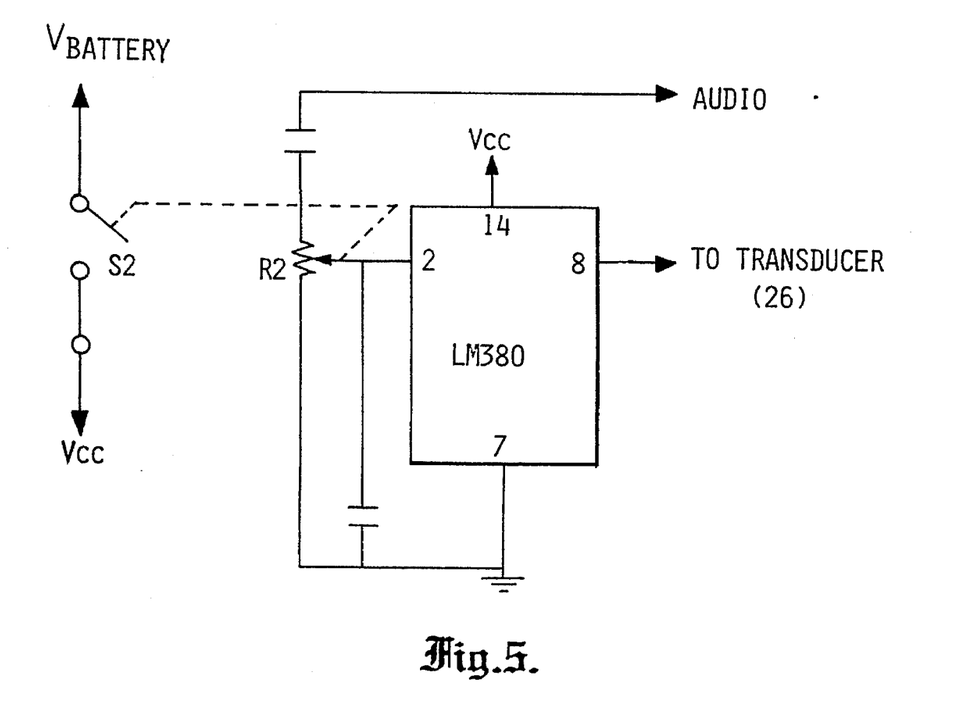
FIG. 5 is a partial schematic diagram showing an audio processing circuit having an LM380 integrated circuit that connects to a control that allows a user to turn the system ON, OFF and control the volume of the sound.

As shown in FIG. 4, the program memory circuit may include one or more switches, such as single-pole double-throw switch S1 that allows a user to select from various programs as are provided by the two HT30108 sound generators. Each of the sound generators is designed with a variety of selectable synthesized digital sounds. The notation "AX" in FIG. 4, illustrates a way of selecting different program memory regions by the use of high-order address bits of the memory device. Timbre and envelope information, such as attack and decay, are pre-programmed into the sound generating circuit 22 in order to provide very realistic sounds in the smallest, lightest package possible. Off-the-shelve single-chip sound generators may be used. The digital type sound generator may also be of the programmable type, which allows a multitude of various types of sounds to be selectively programmed by a programming means. The output of the sound generating circuit 22 is a sound signal which is applied to the audio processing circuit 24.

The circuit 24 may include circuit means for providing mixing, equalization, amplification or other sound enhancements such as phasing or the addition of an echo and/or reverberation circuit. In the preferred embodiment, all the elements and functions of the circuit 24 will be incorporated into a single application specific integrated circuit (ASIC). In the reduction to practice, the audio processing circuit 24 utilized an LM380 integrated circuit that has connected a combination variable resistor/switch R2/S2 as shown in the partial schematic of FIG. 5. The variable resistor/switch R2/S2 allows a user to turn the system ON, OFF and control the volume of the sound. The output of the circuit 24 is an audio transducer drive signal that drives at least one audio transducer 26, various type of audio transducers 24 may be used including a ceramic resonator, a moving coil speaker or a piezo electric resonator.

The second set of signals produced by the program memory circuit 16 as described supra, are the light control signal that are applied to the light control circuit 28 as shown in FIG. 1. The circuit 28 may be as complex as a programmable sequencer or a simple interface to the voltage or current drive circuit 30; whatever the design, the light control circuit 28 has means for receiving the light control signals and thereafter producing light drive signals that are applied to the voltage or current drive circuit 30. In the preferred embodiment, all the elements and functions of the circuit 30 will also be incorporated into a single ASIC.

The circuit 30 as also shown in FIG. 1, consisted in the reduction to practice, of a set of three 2N3904 NPN transistors. Each transistor provides the drive current or voltage and each has the means for receiving and processing the light drive signals and producing the light activating signals.

Figure 6:
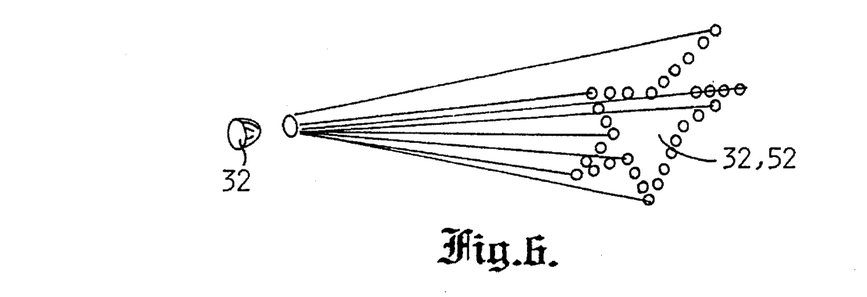
FIG. 6 is a perspective view of a light source and image created by a fiber optic bundle.

The light activating signals are dispersed to energize a multiplicity of multi-colored light sources to some programmed sequential pattern in synchrony with the cadence of the sounds emitted from at least one audio transducer 26. The light source 32 preferably consist of light emitting diodes (LEDs). However, they can also consist of incandescent lamps, neon lamps, electroluminescent panels and/or fiber optic bundles 52. If a fiber optic bundle is used, the light emitting ends, as shown in FIG. 6, can be aesthetically arranged and attached to the article of clothing 60 which in this application would best consist of a vest or jacket. The light emitting ends of the fiber optic bundle are illuminated by at least one light source 32 located at the base of the bundle.

Figure 2:
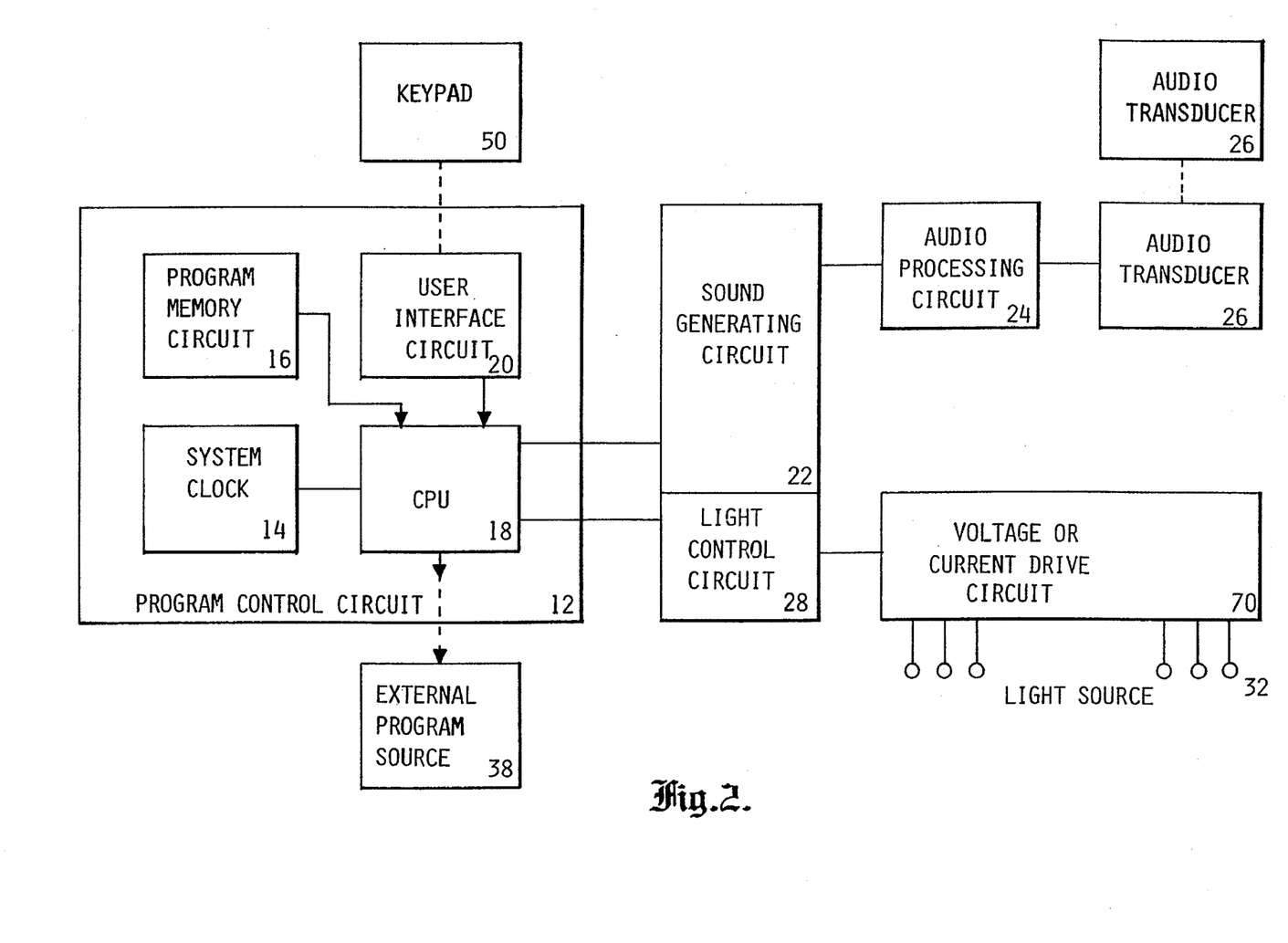
FIG. 2 is a block diagram of an intelligent synthesized music, sound and light system that operates with a second design of a system program control circuit that includes a system clock, a program memory circuit, a CPU and a user interface circuit.

The second system design which is shown in the block diagram of FIG. 2, also consists of a program control circuit 12 having means for producing sound control signals and light control signals. The program control circuit in the second design is comprised of an identical system clock 14 and a program memory circuit 16 as previously described. The difference in this second design is the addition of intelligence through an embedded controller or a central processing unit (CPU) 18 and a user interface circuit 20.

The CPU 18 has means for receiving and processing the time base signal from the system clock 14. The CPU then produces the sound control signals that are applied to the sound generating circuit 22 and the light control signals that are applied to the light control circuit 28. The use of the CPU provides greater flexibility since a programmable sound generating circuit and a programmable light control circuit could be easily programmed. Additionally, the CPU 18 can directly scan the user interface circuit 20 which may consist of a series of user operated switches or a keypad 50 as shown in FIG. 2. Through this user interface 20, via an interface signal, the sound and light programs to be processed by the CPU, can be selected, edited or additional programs added until the capacity of the program memory circuit 16 is exceeded. The program memory in this implementation contains not only the information for the sound and light pattern generation, but also for the operation of the CPU 18 including the function of scanning the user interface circuit 20. Further, the system 10 could also be accessed externally by means of an external program source 38 that has means for producing an external program signal that is applied to the CPU 18 as shown in FIG. 2. The external program source allows the CPU to be downloaded with a selectable library of sound and light generating programs and for the programming to be stored for future use or in-real time.

The final system implementation disclosed, that can be used with both the first and second designs, is a combination of a microphone 40 that operates a light organ circuit 42. The light organ circuit 42 as shown in FIG. 1 has an input that is supplied by the microphone 40 and an output that is connected to the program memory circuit 16 and to the light control circuit 28. The light organ circuit 42 has means for producing a sound disabling signal and simultaneously producing the light trigger signals, signals, directly; or indirectly by controlling the sequencing of the memory circuit that control and trigger the light control circuit 28.

When the circuit 28 is triggered, it produces a light trigger signal that is applied to the voltage or current drive circuit 30 as shown in FIG. 1. As previously described, the circuit 30 then produces the light activating signals in synchrony with the ambient audible sounds detected by the microphone 40. The microphone 40 can be comprised of the speaker 26 when the speaker is of a dynamic type and used as a pickup transducer.

Figure 7:
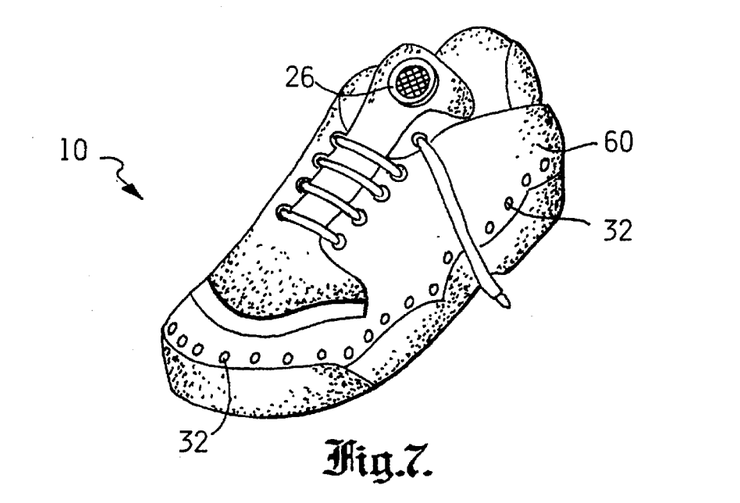
FIG. 7 is a perspective view of a system incorporated into a shoe.
Figure 8:
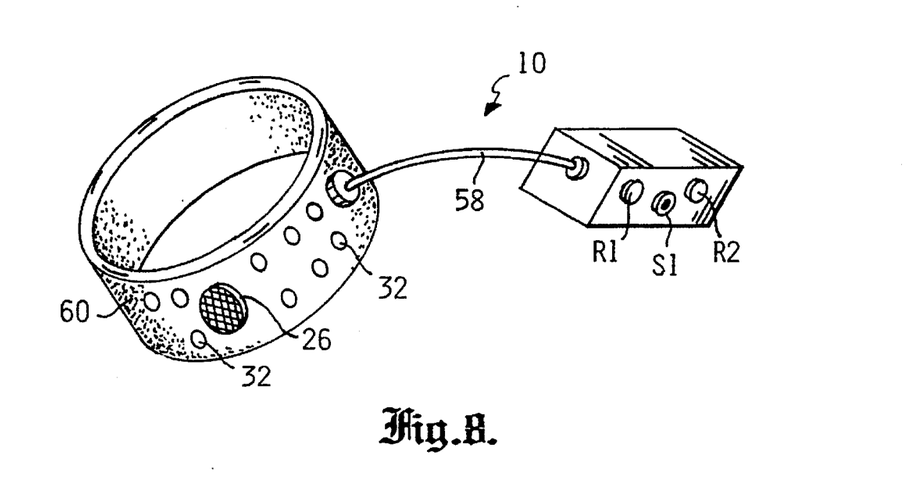
FIG. 8 is a perspective view of a system incorporated into a waist or arm band that is hardwired to a control unit.

The system 10 as described above, is designed to operate primarily as a hardwired cable system that is applied to the article of clothing 60 such as a pair of shoes as shown in FIG. 7 or a waist or arm band through a cable 58 as shown in FIG. 8. If the system 10 is to be implemented into separate articles of clothing, such as a pair of shoes, the system could be implemented using some form of wireless transmission.

Figure 9:
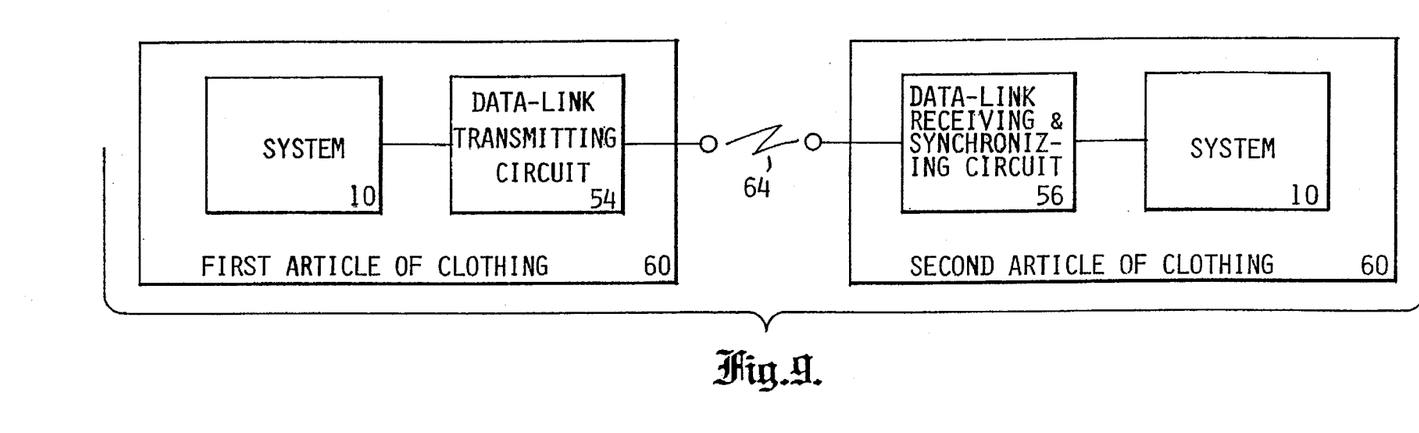
FIG. 9 is a block diagram of a system that is incorporated into a first design that operates with two separate articles of clothing.

In one implementation of this design scheme, as shown in FIG. 9, the first article of clothing incorporates a first system 10 which also includes a data-link transmitting circuit 54. The circuit 54, which can operate by either radio waves or an infrared link, has circuit means for producing and transmitting, via a transmitting means, a master control signal 64 corresponding to the synchronous music, sound and light being produced by the first system 10.

The second article of clothing, incorporates a second system 10 with a substantially identical grouping of light sources, an audio transducer 26 and a data-link receiving and synchronizing circuit 56. The circuit 56 has means for receiving and processing the master control signal 64 and thereafter synchronizing the program control circuits 12 of the respective first and second systems 10. The circuit 56, as shown in FIG. 9, also allows the second article of clothing to operate the light sources and produce sound through the audio transducer 26 in synchrony with the light sources and sounds being produced by the system 10 in the first article of clothing.

Figure 10:
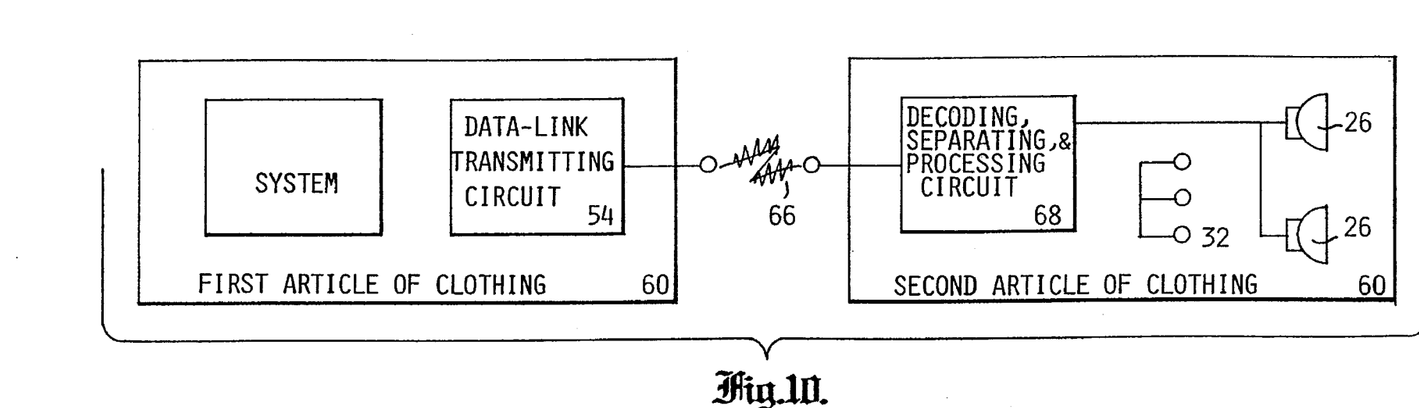
FIG. 10 is a block diagram of a system that is incorporated into a second design that operates with two separate articles of clothing.

A second implementation of the wireless data-link transmitting circuit as shown in FIG. 10 consists of full transmission of the audio and lights program from the system 10 located in the first article of clothing 60. Instead of utilizing only a synchronized master control signal 64, this implementation requires that all the program information be encoded into a full data transmission signal 66. The signal 66 is transmitted to a second article of clothing 60 that has a decoding, separating and processing circuit 68 having means for producing sound and light signals that are applied to and drive the transducer 26 and light sources 32 respectively.

While the invention has been described in complete detail and pictorially shown in the accompanying drawings it is not to be limited to such details, since many changes and modifications may be made in the invention without departing from the spirit and scope thereof. For example, the system can be easily designed so that the sound can be turned off so that only the light display is operational; vice-versa the sound can also be selected to vary from disco to country-western music; the sound can include lyrics as well as the melody, and a stereo effect can be produced when two articles of clothing are used. Thus, it is described to cover any and all modifications and forms which may come within the language and scope of the appended claims.

We claim:

1. A synthesized music, sound and light system comprising:
   a) a program control circuit comprising:
      (1) a system clock having means for producing a time base pulse, and
      (2) a program memory circuit having means for storing in shared memory locations:
         (a) at least one sound program and
         (b) at least one light program wherein said program memory circuit, upon receiving the time base pulse, sequences said program memory circuit and thereafter produces, sound control signals derived from the sound program and light control signals derived from the light program,
   b) a sound generating circuit having means for receiving and processing the sound control signals from said program control circuit and thereafter producing sound signals in accordance with the sound program,
   c) an audio processing circuit having means for receiving and processing the sound signals from said sound generating circuit and thereafter producing audio transducer drive signals that operate at least one audio transducer from where the sound is heard,
   d) a light control circuit having means for processing and receiving the light control signals from said program control circuit and thereafter producing light drive signals in accordance with the light program, and
   e) a voltage or current drive circuit having means for receiving and processing the light drive signals from said light control circuit and thereafter producing light activating signals that sequentially energize a multiplicity of light sources in synchrony with the cadence of the sounds emitted from said at least one audio transducer.

2. The system as specified in claim 1 wherein said sound generating circuit is designed with a variety of selectable synthesized sounds that simulate musical instruments.

3. The system as specified in claim 1 wherein said audio processing circuit further comprises a variable resistor/switch that allows a user to turn said system ON, OFF and control the volume of the sound.

4. The system as specified in claim 1 wherein said audio transducer comprises a ceramic resonator.

5. The system as specified in claim 1 wherein said audio transducer comprises a piezo electric resonator.

6. The system as specified in claim 1 wherein said light sources comprise incandescent lamps.

7. The system as specified in claim 1 wherein said light sources comprise light emitting diodes (LEDs).

8. The system as specified in claim 1 wherein said light sources comprise electroluminescent panels.

9. The system as specified in claim 1 wherein said light sources comprise fiber optic bundles having their light emitting ends aesthetically dispersed and attached to the article of clothing and illuminated by at least one light source located at the base of said fiber optic bundle.

10. The system as specified in claim 1 wherein said system clock further comprises a control that allows a user to control the variable time base or speed of the light sources and the sound.

11. The system as specified in claim 1 wherein said program memory circuit is comprised of a one-time-programmable device.

12. The system as specified in claim 1 wherein said system further comprises a reprogramming circuit means for allowing the editing or changing of the sounds program and the light program.

13. The system as specified in claim 12 wherein said program memory circuit is reprogrammable and comprises an electrically-erasable programmable read only memory (EEPROM).

14. The system as specified in claim 12 wherein said reprogramming circuit means comprises:
   a) a programming means controlled by a user that when activated produces programming signals,
   b) a program interface circuit that receives and processes the reprogramming means and thereafter produces:
      (1) a clock interface signal that is applied to said system clock and that allows a user to control the operation of said system clock, and
      (2) a program memory interface signal that is applied to said program memory circuit and that allows a memory circuit that allows a user to step into and modify memory locations.

15. The system as specified in claim 1 further comprising:
   a) a microphone, and
   b) a light organ circuit having an input connected to said microphone and an output connected to said program memory circuit and said light control circuit, with said light organ circuit having means for producing a sound disabling signal that disables said sound program and simultaneously produces either a light trigger signal that controls and triggers said light control circuit directly or a signal that sequences the memory circuit with the light program and light control signals thereof being active, whereupon, said light control circuit produces a light trigger signal that is applied to said voltage or current drive circuit from where the light activating signals are produced in synchrony with the ambient audible sounds detected by said microphone.

16. The system as specified in claim 15 wherein said microphone is comprised of said audio transducer used in a pick-up mode.

17. The system as specified in claim 1 wherein said program control circuit comprises:
   a) a system clock having means for producing a time base signal,
   b) a central processing unit (CPU) having means for receiving and processing the time base signal from said system clock and thereafter producing the sound control signals applied to said sound generating circuit and the light control signal applied to said light control circuit,
   c) a user interface circuit having means for producing an interface signal that is applied to said CPU, where said user interface circuit includes a series of switches or a keypad from where the user can select and enter into said CPU a sound and light program for processing by said CPU and,
   d) a program memory circuit connected to said CPU and that:
      (1) operates said CPU,
      (2) scans the programs of said user interface circuit, and
      (3) contains program data pertaining to sound and light pattern generation.

18. The system as specified in claim 17 further comprising an external program source having means for producing an external program signal that is applied to said CPU, where said external program source allows said CPU to be downloaded with a selectable library of sound and light generating programs.

19. The system as specified in claim 1 wherein said system is applicable for use on at least one article of clothing.

20. The system as specified in claim 19 wherein said article of clothing comprises a pair of shoes.

21. The system as specified in claim 19 wherein said system operates with a first article of clothing and at least a second, separate article of clothing wherein:
   a) said first article of clothing incorporates a first said system that further comprises a data-link transmitting circuit having means for producing and transmitting, via a transmitting means, a master control signal corresponding to the synchronous sound and light being produced by said first system, and
   b) said second article of clothing incorporates a second said system further comprising a data-link receiving and synchronizing circuit having means for receiving and processing the master control signal and thereafter synchronizing said program control circuit of the said second system in said second article of clothing to operate said light sources and produce sound through said audio transducer in synchrony with the light sources and sound being produced by the first said system in said first article of clothing.

22. The system as specified in claim 21 wherein said transmitting means comprises radio waves.

23. The system as specified in claim 21 wherein said transmitting means comprises an infrared link.

24. The system as specified in claim 21 wherein said transmitting means comprises fiber optics.

25. The system as specified in claim 19 wherein said system operates with a first article of clothing and at least a second, separate article of clothing wherein:
   a) said first article of clothing incorporates a first said system that further comprises a data-link transmitting circuit having means for producing and transmitting, via a transmitting means, a full data transmission signal corresponding to the synchronous sound program and light program being executed by said first system, and
   b) said second article of clothing incorporates a second said system further comprising a data-link receiving and synchronizing circuit having means for decoding, separating and processing the full data transmission signal and thereafter producing sound and light signals that drive said audio transducer and light sources in said second article of clothing in synchrony with the light sources and sound being produced by the first said system in said first article of clothing.

26. The system as specified in claim 25 wherein said transmitting means comprises radio waves.

27. The system as specified in claim 25 wherein said transmitting means comprises an infrared link.

28. The system as specified in claim 25 wherein said transmitting means comprises fiber optics.

29. The system as specified in claim 21 wherein all articles of clothing are capable of operating as second articles of clothing.

30. The system as specified in claim 25 wherein all articles of clothing are capable of operating as second articles of clothing.

31. The system as specified in claim 1 where all the circuits and functions are incorporated into at least one integrated circuit.

32. A synthesized music, sound and light system comprising:
   a) a system clock having means for producing a time base signal,
   b) a program memory circuit having means for receiving and processing the time base signal that sequences the program memory circuit and thereafter produces sound control signals and light control signals,
   c) a sound generating circuit having means for receiving and processing the sound control signals from said program memory circuit and thereafter producing sound signals,
   d) an audio processing circuit having means for receiving and processing the sound signals from said sound generating circuit and thereafter producing an audio transducer drive signals that operate at least one audio transducer from where the sound is heard, with said audio processing circuit further having a control that allows a user to turn the system ON, OFF and control the volume of the sound,
   e) a light control circuit having means for processing and receiving the light control signal from said program memory circuit and thereafter producing light drive signals, f) a voltage or current drive circuit having means for receiving and processing the light drive signals from said light control circuit and thereafter producing light activating signals that sequentially energize a multiplicity of light sources in synchrony with the cadence of the sounds emitted from said at least one audio transducer, and g) a control located in said system clock that allows a user to control the speed of the light sources and the sound.

* * * * *